Patented July 17, 1951

2,560,680

UNITED STATES PATENT OFFICE 2,560,680

ACRYLONITRILE COPOLYMERS

Arthur L. Allewelt, West Chester, Pa., assignor to American Viscose Corporation, Wilmington, Del., a corporation of Delaware No Drawing. Application September 3, 1948, Serial No. 47,752

12 Claims. (Cl. 260—85.5)

This invention relates to improved copolymers of acrylonitrile with acrylamide or certain derivatives thereof, and particularly to the production of such copolymers which are especially adapted by virtue of their improved plasticity for the spinning of filaments as well as for molding purposes in general. Hereinafter, the term "an acrylamide" is intended as a generic expression for the restricted class of related compounds which may be defined in more technical fashion as follows: a mono-amide, having a single unsaturated carbon to carbon bond, of an acid of the group consisting of acrylic acid and alpha-alkyl-substituted alpha-methylene monocarboxylic acid, and N- substituted derivatives thereof, the amide having only a single carbonyl group attached to the N atom. This application is a continuation-in-part of my copending application Serial No. 512,033, filed November 27, 1943, and now abandoned.

Acrylonitrile polymers are insoluble in all common organic solvents; they are fusible at high temperatures but cannot be drawn into filaments and in addition show decomposition at their softening points which are generally above 200° C. Acrylamide polymers swell or dissolve in water and have high softening points around 180° C. to 265° C. In addition, those having the higher melting points show pronounced decomposition when heated to the fused state.

In accordance with the present invention, acrylonitrile is copolymerized with an acrylamide and interpolymerization products containing 70 to 95 mole % of acrylonitrile are obtained which have lower softening temperatures than either the polyacrylonitriles or the polyacrylamides. The preferred copolymers having specific viscosities between 0.07 and 0.12 as defined hereinafter can be fused and maintained in the fused condition for an appreciable period of time without suffering excessive decomposition so that they are adaptable to the conventional molding and shaping techniques.

The acrylamides and their derivatives as defined hereinabove which are copolymerized with acrylonitrile in accordance with this invention include, besides acrylamide itself, methacrylamide, the amides of alpha-ethylacrylic acid, alpha-propylacrylic acid and the higher homologous relatives of this series, and also the N-substituted derivatives of arcylamide, methacrylamide, and so on, such as the N-monoalkyl, N-dialkyl, N-monoaryl, N-diaryl, N-alkylaryl, N-arylalkyl, N-alkyl-N-aryl, and the alicyclic and heterocyclic N-substituents, examples of which are N-methyl, N-ethyl, N-propyl, N-butyl, N-octyl, N-phenyl, N-cyclohexyl, N-beta-phenylethyl, N-napthyl, N-p-hexylphenyl.

In general, the monomeric components are interpolymerized in solution, preferably using as the solvent one which is a non-solvent for the copolymer. Examples of suitable solvents are esters, such as ethyl acetate, methyl acetate, dimethyl phthalate, and the acetate of methyl-n-amyl carbinol, ketones, such as acetone and methyl ethyl ketone, alcohols, such as methanol, ethanol, propanol, isopropanol, butanol, isobutanol, t-butanol and n-hexanol, and miscellaneous solvents, such as butyl chloride, n-decane, toluene, acetonitrile, and trimethylene chlorohydrin. Any temperature may be used from room temperature to 60° C. or higher, but the preferred range is from about 40° C. to about 60° C. A catalyst, such as hydrogen peroxide or an organic peroxide, may be present in small amount from about ½ to 2% of the total weight of the monomers, about 1% being preferred. The dilution ratio (total weight of monomers/weight of solvent) may vary widely from about 3:2 to about 1:3, the preferred ratio falling in the range of about 1:1 to 1:2, and being from 10:8 to 10:15 when isopropanol is used as to solvent.

The ratio of the components in the copolymer may be predetermined by suitably adjusting the proportions of the monomers in the reaction mixture and as exemplified hereinbelow the proportion of acrylonitrile may vary widely such as from about 55 to about 93 percent by weight of the total weight of monomers. The acrylonitrile copolymer contains at least 5 molar percent of the acrylamide constituent but not over 30 molar percent thereof, since it has been found that the introduction of these proportions of the acrylamide produces polymers which will soften and fuse to a liquid state without decomposition and they can be converted into textile filaments which tend to pick up a small amount of moisture sufficient to improve the "feel" of fabrics made therefrom but insufficient to impart a definitely damp feel which would be objectionable.

In the Examples, the parts given are by weight unless otherwise noted.

Example I

Three parts of acrylonitrile, one part of acrylamide, 0.04 parts of benzoyl peroxide and four parts of ethyl acetate were mixed together and polymerized in a closed vessel at 50° C. with agitation for a period of 40 hours. The unreacted portions were removed by extraction with hot alcohol and the remaining polymer was dried. The copolymer contained about 25 molar percent of the acrylamide component softened at about 165° C. but never became fluid even when higher temperatures were used. Decomposition set in at about 175° C. and became rapid at about 200° C. The copolymer could be molded above its softening point under high pressure.

*Example II*

7.9 parts of acrylonitrile, 1.4 of N-phenyl acrylamide, 0.094 parts of benzoyl peroxyl and 9.5 parts of propyl alcohol were mixed together and polymerized in a closed vessel at 50° C. with agitation for a period of 28 hours. The unreacted portions were removed by extraction with hot alcohol and the remaining polymer was dried. The copolymer contained about 12 molar percent of the N-phenyl acrylamide component and softened at about 170° C. Decomposition set in at about 180° C. and was rapid at 200° C. The copolymer never became fluid at these temperatures. The copolymer could be molded at about 175° C. under high pressure.

*Example III*

4.77 parts of acrylonitrile, 0.85 part of N-methylacrylamide, and 0.028 part of benzoyl peroxide were mixed with 5.6 parts of acetone in a vessel which was sealed and heated at 50° C. for 136 hours. A 92% yield was obtained of a copolymer containing 25.5 mol % of acrylamide and the balance of acrylonitrile. The copolymer was soluble in formic acid, swelled in benzene and formamide, and was insoluble in acetone, ethyl acetate, acetonitrile, isopropanol, chloroform, and dioxane. It had no softening point but decomposed at 190° C. Solutions of the polymer containing about 15% thereof could be spun through spinnerets into a liquid coagulating or gaseous evaporated medium.

*Example IV*

4.24 parts of acrylonitrile, 1.42 parts of acrylamide, and 0.566 part of benzoyl peroxide were mixed in 6 parts of acetone in a vessel which was then sealed and heated at 50° C. for 40 hours. A 90% yield of a copolymer containing 22 mol % of acrylamide and 78 mol % of acrylonitrile was obtained. The copolymer had a high molecular weight as evidenced by the fact that it only swelled in formic acid and formamide and was insoluble in all of the other solvents mentioned in Example III.

*Example V*

The same procedure was followed as in Example IV except that the acetone was replaced by acetonitrile. The copolymer contained 22 mol % of acrylamide. It swelled in formic acid. It was insoluble in formamide as well as the other solvents mentioned in Example III.

*Example VI*

The procedure of Example IV was followed using ethyl acetate instead of acetone as the solvent. The product contained 25 mole % of acrylamide. It swelled in formic acid and was slightly soluble in formamide, but was insoluble in the other solvents mentioned in Example III.

*Example VII*

The procedure of Example IV was followed using methyl ethyl ketone in place of acetone as the solvent. The product contained 28 mole % of acrylamide. It was soluble in formic acid, slightly soluble in formamide, but insoluble in the other solvents mentioned in Example III.

*Example VIII*

21.2 parts of acrylonitrile, 1.46 parts of N-phenyl acrylamide, 0.22 part of benzoyl peroxide, and 11 parts of isopropyl alcohol were polymerized together in a closed system at 50° C. for 40 hours. The resulting co-polymer after being freed from unreacted monomers, was found to have a high molecular weight and to contain 95 mole % of acrylonitrile.

The copolymers can be spun into filaments by fusion-spinning or by wet- or dry-spinning with suitable solvents. In filaments made of acrylonitrile-acrylamide copolymers, the amide component imparts pliability, elasticity, and appreciable moisture retention. The copolymers are also useful as molding materials for making rods, tubes, sheets, and the like. They may be rolled into sheets and fibers. Soluble copolymers may be used in casting fibers and for making coatings. Fillers, dyes, pigments, and plasticizers, such as formamide, dibutyl phthalate and tricresyl phosphate, may be compounded with the copolymers to vary the properties thereof.

A preferred class of copolymers are those obtained by interpolymerization in the presence of isopropyl alcohol at a monomer to solvent dilution ratio in the range of 10:8 to 10:20 parts by weight. As distinguished from the products obtained in the presence of other solvents including even the other alcohols at corresponding or even much higher dilution ratios, those obtained when using isopropyl alcohol at a monomer to solvent dilution ratio in the range of 10:8 to 10:20 parts by weight have lower softening points (about 140° C. to 180° C.), greater differences between softening points and decomposition temperatures, and fuse to a fluid state generally at temperatures well below their decomposition temperatures.

In the fluid condition, they can be drawn into filaments. Such filaments are of thermoplastic character and are advantageous particularly in the making of yarns, cords, such as tire cords, textile fabrics and felts as well as industrial fabrics and felts. Such articles may be made entirely of such thermoplastic fibers or filaments or they may comprise a mixture thereof with non-thermoplastic fibers or filaments. In either event, the structure of the article, whether it is a yarn, cord, fabric, felt or paper-like felt, can be stabilized and strengthened by heating to render at least some of the thermoplastic fibers tacky and adhesive so that upon cooling, the fibers become autogenously bonded to one another. In some cases, the stabilization and strengthening can be effected by heating sufficiently only to shrink the filaments or fibers without rendering them tacky in which event the distorted shrunk form of the fibers serves to interlock other adjoining fibers. These thermoplastic fibers are extremely valuable in this connection since their softening points are well above the boiling point of water and yet they are well below their decomposition point.

In addition, the copolymers are neither dissolved nor swollen by the isopropanol so that they are obtained as non-tacky, white, granular, easily pulverizable masses. The group of copolymers of particular value for the production of filaments by melt-spinning consists of those made in the presence of isopropyl alcohol at a monomer to solvent dilution ratio in the range of 10:8 to 10:20 parts by weight and consisting of 70 to 95 molar percent by weight of the acrylonitrile component and the balance of the acrylamide or derivative thereof. These copolymers have specific viscosities ($N_{sp}$) without a plasticizer between about 0.07 and 0.12 as determined by the Staudinger method, using 0.1 gram of copolymer dissolved in 50 cc. of 88 percent formic acid in water as the solvent at 25° C. Assuming Staudinger's constant Km to be approximately that of polyacrylonitrile, these values indicate degrees of polymerization from about 230 to 400. A preferred class within this group is made up of those having from 85 to 95 molar percent by weight of acrylonitrile and the balance of an acrylamide, having an $N_{sp}$ between about 0.11 to 0.12 corresponding to a degree of polymerization of about 365 to 400. This upper limit is from ⅕ to ½ the degree of polymerization of the products obtained in such procedures as those of Examples III to VIII.

Thus it appears that isopropyl alcohol acts as a chain-breaking agent of outstanding effectiveness even at a low and hence practical dilution ratio as compared to the other solvents mentioned, and thereby controls the degree of polymerization to yield copolymers of lower molecular weight and also narrows the range of molecular weights in a given product. It also appears to have a negligible swelling effect upon the copolymers produced therein as compared to other solvents in general. When using other solvents, it has not been possible to control satisfactorily at practical dilution rates the polymerization to produce copolymers having sufficiently low molecular weight and viscosity in the fused state to be capable of being drawn or extruded into filaments.

Example IX 9.5 parts of acrylonitrile, 2.9 parts of N-phenyl-acrylamide, 0.12 part benzoyl peroxide and 12 parts of isopropyl alcohol were mixed together. This mixture was polymerized at 50° C. for 48 hours in a closed vessel with agitation. The resulting copolymer was washed with hot alcohol and was then dried. This co-polymer had a softening point of about 140° C. and was found to be easily molded, rolled and extruded (in fused condition) into threads at higher temperatures. It was insoluble in all common organic solvents. The analysis showed it to contain 20.9 per cent nitrogen which corresponds to a co-polymerized acrylonitrile content of about 85 molar per cent.

A similar product prepared in acetone or other alcohols was incapable of being extruded into threads and was molded and rolled only with great difficulty.

Example X

A mixture of 11.3 parts of acrylonitrile, 8.0 parts of N-cyclohexyl acrylamide, 0.2 part of benzoyl peroxide and 21 parts of isopropyl alcohol was copolymerized in a closed vessel at 50° C. for 40 hours. The resulting copolymer containing 77 molar percent of acrylonitrile was granular and after being washed and dried was easily converted into a fine white powder. The material is thermoplastic and capable of being molded, rolled or extruded when heated.

Example XI

To 4.2 parts of acrylonitrile and 1.7 parts of N-methyl acrylamide, there were added 0.029 parts of benzoyl peroxide as a catalyst and 6 parts of isopropyl alcohol as a diluent. The mixture of monomers was polymerized in a glass container at 50° C. over a period of 72 hours. When freed from remaining monomers by extractions with alcohol and ether the product was obtained as a white powder. It was soluble in formic acid but insoluble in most common organic solvents. The copolymer containing 65 molar percent of acrylonitrile was found capable of being formed into threads, filaments or other shaped articles with great ease.

A similar product prepared as above but using toluene as a diluent instead of isopropyl alcohol was not soluble in formic acid. It could not be formed into threads, or filaments at all, nor could it be molded into other shaped articles except with great difficulty.

Example XII 4.7 parts of acrylonitrile and 1.13 parts of N-propyl acrylamide were polymerized in the presence of 0.05 parts of benzoyl peroxide and 5.9 parts of isopropyl alcohol at 50° C. over a period of 40 hours. The copolymer separated from the monomer mixture as a white powder and was easily washed and dried. This copolymer (containing 88 molar percent of acrylonitrile) was thermoplastic and capable of being readily molded, extruded, or shaped as desired.

Example XIII 4.2 parts of acrylonitrile, 3.5 parts of N-beta-phenyl-ethyl acrylamide, 0.077 part of benzoyl peroxide and 7.7 parts of isopropyl alcohol were polymerized at 50° C. for 48 hours in a closed vessel with agitation. The resulting co-polymer (containing 78 molar percent of acrylonitrile) was worked at and above its softening point into molded articles, threads, filaments, films and other shaped articles.

Example XIV 4.2 parts of methacrylamide was dissolved in a mixture of 10.6 parts of acrylonitrile and 15 parts of isopropyl alcohol. Then 0.14 part of benzoyl peroxide was added and the mixture was polymerized at 50° C. for 40 hours. When freed from remaining monomers and solvent the copolymer (containing 3 molar percent of acrylonitrile) was obtained as a white powder which was found capable of being readily molded.

Example XV 15.9 parts of acrylonitrile, 1.4 parts of acrylamide, 0.17 part of benzoyl peroxide, and 17 parts of isopropyl alcohol were mixed together and polymerized in a closed system at 50° C. for 40 hours. The product (containing 88 molar percent of acrylonitrile) after washing with alcohol and drying was obtained as a white powder capable of being molded, rolled, or extruded into threads or filaments above their softening points.

Example XVI 4.2 parts of acrylonitrile, 1.4 parts of acrylamide, 0.056 part of benzoyl peroxide and 1.8 parts of isopropyl alcohol were mixed together in a glass tube and sealed. The mixture was polymerized at 40° C. with agitation. After 56 hours, an almost quantitative yield of white powder (containing 5 molar percent of acrylonitrile) was obtained which was found to be capable of being molded, extruded or shaped as desired.

I claim:

1. The process of copolymerizing acrylonitrile with a mono-amide, having a single unsaturated carbon to carbon bond and a single carbonyl group attached to the N atom, of an acid of the group consisting of acrylic acid and alpha-alkyl-substituted acrylic acids, in isopropyl alcohol in the presence of a catalyst, the monomer to solvent dilution ratio being in the range of 10:8 to 10:20 parts by weight and the acrylonitrile being present in a proportion between about 55 and about 93% by weight of the total weight of the monomers.

2. The process of copolymerizing acrylonitrile with a mono-amide, having a single unsaturated carbon to carbon bond and a single carbonyl group attached to the N atom, of an acid of the group consisting of acrylic acid and alpha-alkyl-substituted acrylic acids, in isopropyl alcohol at a temperature of 40° C. to 60° C. in the presence of a catalyst at a monomer to solvent dilution ratio in the range of 10:8 to 10:20 parts by weight, the acrylonitrile being present in a proportion between about 55 and about 93% by weight of the total weight of the monomers.

3. The process of copolymerizing acrylonitrile with an N-monoaryl-acrylamide in isopropyl alcohol in the presence of a catalyst, the monomer to solvent dilution ratio being in the range of 10:8 to 10:20 parts by weight and the acrylonitrile being present in a proportion between about 55 and about 93% by weight of the total weight of the monomers.

4. The process of copolymerizing acrylonitrile with an N-monoaryl-acrylamide in isopropyl alcohol in the presence of a catalyst at a temperature of 40° C. to 60° C., the monomer to solvent dilution ratio being in the range of 10:8 to 10:20 parts by weight and the acrylonitrile being present in a proportion between about 55 and about 93% by weight of the total weight of the monomers.

5. The process of copolymerizing acrylonitrile with N-phenyl-acrylamide in isopropyl alcohol in the presence of a catalyst, the monomer to solvent dilution ratio being in the range of 10:8 to 10:20 parts by weight and the acrylonitrile being present in a proportion between about 55 and about 93% by weight of the total weight of the monomers.

6. The process of copolymerizing acrylonitrile with N-phenyl-acrylamide in isopropyl alcohol in the presence of a catalyst at a temperature of 40° C. to 60° C., the monomer to solvent dilution ratio being in the range of 10:8 to 10:20 parts by weight and the acrylonitrile being present in a proportion between about 55 and about 93% by weight of the total weight of the monomers.

7. A copolymer obtained by the process of claim 1 comprising 70 to 95 molar percent by weight of acrylonitrile and the balance of a mono-amide, having a single unsaturated carbon to carbon bond and a single carbonyl group attached to the N atom, of an acid of the group consisting of acrylic acid and alpha-alkyl-substituted acrylic acids, said copolymer having a specific viscosity between 0.07 to 0.12 determined by the Staudinger viscometric method using 0.1 gram of copolymer dissolved in 50 cc. of 88 percent formic acid as a solvent at 25° C.

8. A copolymer of acrylonitrile and N-alkyl acrylamide obtained by the process of claim 1 which is fusible to a fluid condition below its decomposition temperature, said copolymer comprising 70 to 95 molar percent by weight of acrylonitrile and having a specific viscosity between 0.11 and 0.12 determined by the Staudinger viscometric method using 0.1 gram of copolymer dissolved in 50 cc. of 88 percent formic acid as a solvent at 25° C.

9. A copolymer of acrylonitrile and N-aryl acrylamide obtained by the process of claim 3 which is fusible to a fluid condition below its decomposition temperature, said copolymer comprising 70 to 95 molar percent by weight of acrylonitrile and having a specific viscosity between 0.11 and 0.12 determined by the Staudinger viscometric method using 0.1 gram of copolymer dissolved in 50 cc. of 88 percent formic acid as a solvent at 25° C.

10. A copolymer of acrylonitrile and N-phenyl acrylamide obtained by the process of claim 6 which is fusible to a fluid condition below its decomposition temperature, said copolymer comprising 85 to 95 molar percent by weight of acrylonitrile and having a specific viscosity between 0.11 and 0.12 determined by the Staudinger viscometric method using 0.1 gram of copolymer dissolved in 50 cc. of 88 percent formic acid as a solvent at 25° C.

11. A copolymer of acrylonitrile and N-cyclohexyl acrylamide obtained by the process of claim 2 which is fusible to a fluid condition below its decomposition temperature, said copolymer comprising 85 to 95 molar percent by weight of acrylonitrile and having a specific viscosity between 0.11 and 0.12 determined by the Staudinger viscometric method using 0.1 gram of copolymer dissolved in 50 cc. of 88 percent formic acid as a solvent at 25° C.

12. A copolymer of acrylonitrile and N-methyl acrylamide obtained by the process of claim 2 which is fusible to a fluid condition below its decomposition temperature, said copolymer comprising 70 to 95 molar percent by weight of acrylonitrile and having a specific viscosity between 0.11 and 0.12 determined by the Staudinger viscometric method using 0.1 gram of copolymer dissolved in 50 cc. of 88 percent formic acid as a solvent at 25° C.

ARTHUR L. ALLEWELT.

REFERENCES CITED

The following references are of record in the file of this patent:

UNITED STATES PATENTS

| Number | Name | Date |
| --- | --- | --- |
| 1,933,052 | Fikentscher et al. | Oct. 31, 1933 |
| 2,066,105 | Hagedorn et al. | Dec. 29, 1936 |
| 2,311,548 | Jacobson et al. | Feb. 16, 1943 |
| 2,436,926 | Jacobson | Mar. 2, 1948 |
| 2,456,360 | Arnold | Dec. 14, 1948 |